United States Patent
Chen et al.

(10) Patent No.: US 7,338,184 B2
(45) Date of Patent: Mar. 4, 2008

(54) DIRECT-TYPE BACK LIGHT MODULE, DIFFUSER PLATE AND METHOD OF FABRICATING THE SAME

(75) Inventors: Mei-Ying Chen, Tainan (TW); Shih Hsien Kuo, Tainan (TW); Shih Yuan Feng, Tainan (TW); Chun Lung Tseng, Tainan (TW)

(73) Assignee: Chi Mei Optoelectronics Corp. (TW)

( * ) Notice: Subject to any disclaimer, the term of this patent is extended or adjusted under 35 U.S.C. 154(b) by 0 days.

(21) Appl. No.: 11/064,926

(22) Filed: Feb. 24, 2005

(65) Prior Publication Data
US 2006/0007667 A1    Jan. 12, 2006

(30) Foreign Application Priority Data
Jul. 7, 2004    (TW) .............................. 93120304 A

(51) Int. Cl.
*F21V 5/00*    (2006.01)
(52) U.S. Cl. .................. 362/246; 362/97; 362/355; 362/612; 349/64; 359/599
(58) Field of Classification Search ................ 362/97, 362/240, 246, 612, 355; 349/64; 359/599
See application file for complete search history.

(56) References Cited

U.S. PATENT DOCUMENTS

| | | | | |
|---|---|---|---|---|
| 5,384,658 A | * | 1/1995 | Ohtake et al. | 359/599 |
| 5,473,454 A | * | 12/1995 | Blanchard | 359/599 |
| 6,513,943 B2 | * | 2/2003 | Fukuyoshi | 362/613 |
| 6,614,170 B2 | | 9/2003 | Wang et al. | |
| 2003/0118750 A1 | * | 6/2003 | Bourdelais et al. | 428/1.3 |
| 2006/0152651 A1 | * | 7/2006 | Negley et al. | 349/64 |

* cited by examiner

*Primary Examiner*—Stephen F Husar
(74) *Attorney, Agent, or Firm*—Trop, Pruner & Hu, P.C.

(57) ABSTRACT

A direct-type back light module, a diffuser plate and a method fabricating the same are provided. The direct-type back light module includes a lamp box, a plurality of light sources and a diffuser plate. The light sources are arranged in the lamp box to serve as a surface light source. The diffuser plate is disposed in the lamp box above the light source. In addition, a plurality of micro bubbles is distributed in the diffuser plate to diffuse the light incident on the diffuser plate. The method of fabricating the diffuser plate includes providing an injection molding apparatus and a diffuser plate material. Then, at least a diffuser plate material is injected to form the diffuser plate. In addition, a plurality of micro bubbles is formed within the diffuser plate material during the injection step.

16 Claims, 1 Drawing Sheet

DIRECT-TYPE BACK LIGHT MODULE, DIFFUSER PLATE AND METHOD OF FABRICATING THE SAME

BACKGROUND OF THE INVENTION

1. Field of the Invention

The present invention relates to a direct-type back light module, a diffuser plate and a method of fabricating the same. More particularly, the present invention relates to a direct-type back light module, a diffuser plate with enhanced transmittance and a method of fabricating the same.

2. Description of Related Art

Recently, along with the enhancement of the performance of the computer and the development of internet and the multimedia technology, the transmission of the image information has progressed from analog transmission to digital transmission. In order to meet the need of the consumers, the size of the video or image device should be smaller, thinner and lighter. Even though the performance of the conventional cathode ray tube (CRT) display is widely acceptable, however, the size of the electron tube of the CRT display is huge, besides the radiations emitted from the CRT display is a health concern. Therefore, with the development of the optoelectronic and semiconductor technology, the flat panel display (FPD) such as liquid crystal display (LCD), organic electroluminescence display (OELD) or plasma display panel (PDP) has gradually become the main stream of the display.

In general, the LCD may be classified into reflective-type LCD (reflective LCD), transmission-type LCD (transmissive LCD) and semi-transmissive semi-reflective LCD according to the light source thereof. For example, the transmissive LCD or the semi-transmissive semi-reflective LCD is mainly constructed from a liquid crystal panel and a back light module. The liquid crystal panel is constructed from two layers of transparent substrate and a liquid crystal layer disposed between the two transparent substrates. The back light module is adopted for providing the surface light source of the liquid crystal panel.

FIG. 1 is a schematic cross-sectional view and an enlarged local view of a conventional direct-type back light module. Referring to FIG. 1, the direct-type back light module 100 includes a lamp box 110, a plurality of cold cathode fluorescence lamp (CCFL) tubes 120 and a diffuser plate 130. The material of the lamp box 110 includes light reflective material. Therefore, most of light emitted from the cold cathode fluorescence lamp tubes 120 be used by the LCD. In addition, the cold cathode fluorescence lamp tubes 120 are arranged with mutually applicable intervals. Therefore, the brightness of the surface light source between two adjacent cold cathode fluorescence lamp tubes 120 is lower. Since the uniformity of the light source of the back light module is important, thus, the diffuser plate 130 is disposed on the light outputting plane of the direct-type back light module 100.

Generally, in the conventional technology, in order to render the diffusion of the light via the diffuser plate 130 is uniform, a plurality of diffusion particles 132 are doped in the diffuser plate 130. However, the transmittance of the diffusion particles 132 used in the conventional technology is bad, and the conventional diffusion particles 132 is of optically lower transmittance than that of the air medium. Therefore, the overall transmittance of the diffuser plate 130 is reduced, and the brightness of the surface light source provided by the direct-type back light module 100 is also reduced. In order to resolve the problem of reduction in the brightness of the surface light source provided by the direct-type back light module 100, a prism film 140 is disposed in the direct-type back light module 100 in a conventional technology. However, this increases the costs. Therefore, how to prevent the reduction of the transmittance due to the diffusion particles 132 and to enhance the brightness of the surface light source provided by the direct-type back light module 100 is an important issue.

Moreover, in the conventional technology, the diffuser plate 130 is mechanical structurally weak, and the doped diffusion particles 132 are highly hygroscopic. Therefore, when the diffuser plate 130 expands due to heat and/or absorption of moisture under certain circumstances, the warping of the diffuser plate 130 due to a weak mechanical structure would easily occur.

In addition, in the conventional technology, diffuser plate 130 is manufactured by first forming a large mother plate (not shown), and then the mother plate is cut by using a computer numerical control (CNC) machine to obtain a plurality of diffuser plates 130. However, the use of CNC machine for fabricating the diffuser plates 130 could be expensive, and the efficiency of cutting of the mother plate is low and not effective.

SUMMARY OF THE INVENTION

Therefore, the present invention is directed to a diffuser plate for increasing the transmittance and solving the deformation due to absorption of moisture or heat.

In addition, the present invention is directed to an efficient and cost effective method of fabricating a diffuser plate.

The present invention is also directed to a direct-type back light module for increasing the brightness of the light source and reducing the costs.

According to one embodiment of the present invention, a direct-type back light module comprising, for example but not limited to, a lamp box, a plurality of light sources and a diffuser plate is provided. The light sources are arranged in the lamp box and serve as a surface light source. The diffuser plate is disposed in the lamp box above the light source. In addition, a plurality of micro bubbles is distributed in the diffuser plate to diffuse the light incident to the diffuser plate.

In one embodiment of the present invention, the material of the diffuser plate comprises, for example but not limited to, thermoplastic material such as polycarbonate (PC), polypropylene (PP) or acrylonitrile butadiene styrene (ABS) or thermosetting plastic material such as poly-(methyl methacrylate) (PMMA).

In one embodiment of the present invention, the direct-type back light module may further comprise, for example but not limited to, at least an optical film disposed in the lamp box over the diffuser plate. The optical film comprises, for example but not limited to, a prism film.

In one embodiment of the present invention, the light source comprises, for example but not limited to, a cold cathode fluorescence lamp (CCFL) tube or a light emitting diode (LED).

According to one embodiment of the present invention, a diffuser plate for a back light module is provided. It is noted that a plurality of micro bubbles are distributed in the diffuser plate to diffuse the light incident to the diffuser plate.

In one embodiment of the present invention, the material of the diffuser plate comprises, for example but not limited to, a polycarbonate (PC) or a poly-(methyl methacrylate) (PMMA).

According to one embodiment of the present invention, a method of fabricating a diffuser plate is provided. First, an injection molding apparatus and a diffuser plate material are provided. Thereafter, the diffuser plate material is injected into the molding apparatus to form at least one diffuser plate. It is noted that a plurality of micro bubbles is formed in the diffuser plate material when the diffuser plate is formed during the injection step.

In one embodiment of the present invention, the mold injection method of forming the diffuser plate comprises, for example but not limited to, a micro cellular plastics mold injection method or a micro cellular foaming injection molding method.

Accordingly, in the diffuser plate and direct-type back light module of the present invention, since the micro bubbles are formed in the diffuser plate, the transmittance of the diffuser plate may be increased drastically. Therefore, the brightness of the surface light source provided by the direct-type back light module is increased. In addition, the process time of fabricating the diffuser plate according to the present invention is shortened and thereby reduce the costs.

One or part or all of these and other features and advantages of the present invention will become readily apparent to those skilled in this art from the following description wherein there is shown and described one embodiment of this invention, simply by way of illustration of one of the modes best suited to carry out the invention. As it will be realized, the invention is capable of different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
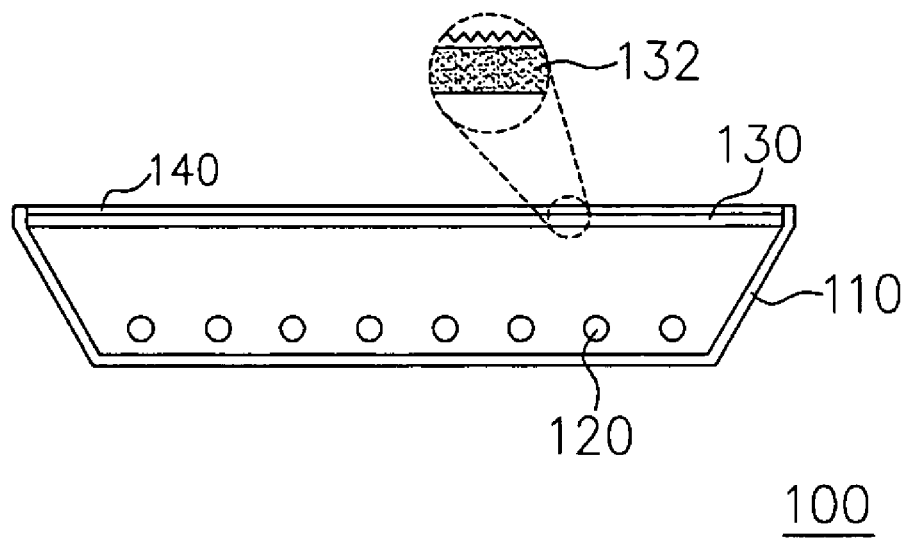
FIG. 1 is a schematic cross-sectional view of a conventional direct-type back light module and a magnified view of a section 132 thereof.
Figure 2:
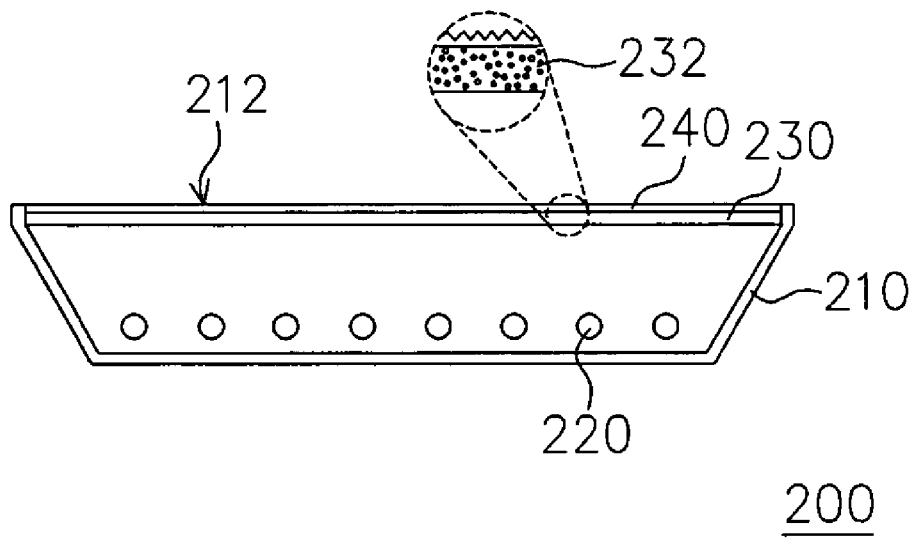
FIG. 2 is a schematic cross-sectional view of a direct-type back light module and a magnified view of a section 232 according to one embodiment of the present invention.

FIG. 2 is a schematic cross-sectional view of a direct-type back light module and a magnified view of a section 232 thereof according to one embodiment of the present invention. Referring to FIG. 2, the direct-type back light module 200 comprises, for example but not limited to, a lamp box 210, a plurality of light sources 220 and a diffuser plate 230.

The material of the lamp box 210 comprises, for example but not limited to, a material with high reflectivity with respect to light. Therefore, most of the light provided from the light source 220 may exit the light outputting plane 212 of the lamp box 210. The light source 220 is arranged in the lamp box 210 to serve as a surface light source. The light source 220 comprises, for example but not limited to, a cold cathode fluorescence lamp (CCFL) tube (as shown in FIG. 2) or a light emitting diode (LED).

The diffuser plate 230, according to an embodiment of the present invention, is disposed in the lamp box 210 above the light source 220. In other words, the diffuser plate 230 may be disposed at the light outputting plane 212 of the lamp box 210. It should be noted that a plurality of micro bubbles 232 are distributed in the diffuser plate 230. Therefore, when the light provided by the light source 220 is incident on the diffuser plate 230, the light diffusion phenomenon such as refraction or reflection occur due to the micro bubbles 232 distributed in the diffuser plate 230. Therefore, the light exiting from the light outputting plane 212 of the lamp box 210 via the diffuser plate 230 is fully diffused. In addition, the possibility of light penetrated from the diffuser plate 230 is enhanced drastically since the transmittance of the micro bubbles 232 is excellent. In other words, the brightness of the surface light source provided by the direct-type back light module 200 is much higher than that of the conventional technology. Thus, the need of an optical film such as a prism film or a brightness enhancement film (BEF) for enhancing the brightness can be effectively avoided, therefore the overall costs of the direct-type backlight module can be effectively reduced.

Furthermore, the micro bubbles 232 distributed in the diffuser plate 230 enhance the mechanical structure of the diffuser plate 230. Therefore, even though the diffuser plate 230 of the present invention is adopted to serve as the back light module of larger size flat panel display (FPD), the position of the diffuser plate 230 in the lamp box 210 can be still maintained. Furthermore, the problem of the deformation due to heat or absorption of water can be effectively reduced.

In the present embodiment, the diffuser plate 230 comprises a transparent thermoplastic material, such as polycarbonate (PC), polypropylene (PP) or acrylonitrile butadiene styrene (ABS), or transparent thermosetting plastic material such as poly-(methyl methacrylate) (PMMA).

Furthermore, although the brightness of the surface light source of the direct-type back light module 200 described above is much higher than that of the conventional technology, it is possible to increase the brightness of the surface light source further. In one embodiment of the present invention, at least an optical film 240 may be further disposed in the direct-type back light module 200 over the diffuser plate 230 in the lamp box 210. The optical film 240 comprises, for example but not limited to, a prism film or a brightness enhancement film (BEF) or other optical films.

Hereinafter, the method of fabricating the diffuser plate described above will be described according to one embodiment of the present invention. First, an injection molding apparatus and a diffuser plate material are provided. Thereafter, the diffuser plate material is injected into the injection molding apparatus to obtain at least one diffuser plate. In other words, at least one diffuser plate is formed in each injection step, and therefore to the conventional method of cutting for obtaining the diffuser plate can be effectively avoided. Therefore, the process of fabricating the diffuser plate can be flexible and the process equipment can be easily controlled. Furthermore, both the performance and the mechanical structure of the diffuser plate can be effectively promoted. It is noted that, during the injection step, a plurality of micro bubbles may further be formed in the diffuser plate material simultaneously. Therefore, a plurality of micro bubbles 232 may be distributed in the diffuser plate (as the diffuser plate 230 shown in FIG. 2) after the injection step.

In the present embodiment, the injection molding method is, for example but not limited to, a micro cellular plastics (MCP) injection molding technology or a micro cellular foaming (MCF) injection molding technology, wherein the process parameters such as the amount of the bubbles and the injection molding pressure may be optimized.

Accordingly, in diffuser plate and direct-type back light module of the present invention, a plurality of micro bubbles are distributed in the diffuser plate to increase the diffusion of light. It is noted that, since the transmittance of the micro bubbles is much higher than the diffusion particles used in the conventional technology, the transmittance of the diffuser plate may be enhanced drastically. Thus, the brightness of the surface light source provided by the direct-type back light module also be enhanced. In addition, the mechanical structure of the diffuser plate may also be increased due to the distribution of the micro bubbles. Therefore, the problem of deformation such as warping or bending of the diffuser plate due to heat or absorption of moisture in certain circumstances can be effectively reduced. Thus, the diffuser plate can also be adopted in larger size back light module. Furthermore, because the diffuser plate is formed by using injection molding process directly, and therefore the need of cutting the mother plate for obtaining the diffuser plates can be effectively avoided. Therefore, the process time can be shortened and the costs can be reduced.

The foregoing description of the embodiment of the present invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A back light module, comprising:
   a lamp box;
   a plurality of light sources, arranged in the lamp box, for serving as a surface light source;
   a diffuser plate, disposed in the lamp box above the plurality of light sources, wherein a plurality of micro bubbles are distributed within the diffuser plate, for diffusing light incident on the diffuser plate; and
   at least an optical film, disposed in the lamp box over the diffuser plate.

2. The back light module of claim 1, wherein a material of the diffuser plate comprises a thermoplastic.

3. The back light module of claim 2, wherein a material of the diffuser plate comprises one of a polycarbonate (PC), a polypropylene (PP), and an acrylonitrile butadiene styrene (ABS).

4. The back light module of claim 1, wherein a material of the diffuser plate comprises a thermosetting plastic.

5. The back light module of claim 4, wherein a material of the diffuser plate comprises a poly-(methyl methacrylate) (PMMA).

6. The back light module of claim 1, wherein the optical film comprises a prism film.

7. The back light module of claim 1, wherein each of the plurality of light sources comprises one of a cold cathode fluorescence lamp (CCFL) tube and a light emitting diode (LED).

8. A method of fabricating a diffuser plate, comprising:
   providing an injection molding apparatus and a diffuser plate material; and
   injecting the diffuser plate material into the injection molding apparatus for obtaining at least one diffuser plate, wherein a plurality of micro bubbles are distributed within the diffuser plate.

9. The method of fabricating a diffuser plate according to claim 8, wherein the step of injecting the diffuser plate comprises a micro cellular plastics injection method or a micro cellular foaming injection method.

10. A back light module, comprising:
    a lamp box;
    a plurality of light sources, arranged in the lamp box, for serving as a surface light source;
    a diffuser plate, disposed in the lamp box above the plurality of light sources, wherein a plurality of micro bubbles are distributed within the diffuser plate, for diffusing light incident on the diffuser plate; and
    wherein the plurality of micro bubbles in the diffuser plate are micro bubbles created by one of micro cellular plastics injection molding and micro cellular foaming injection molding.

11. An apparatus for a back light module, comprising:
    a diffuser plate having a plurality of micro bubbles, distributed within the diffuser plate, for diffusing light incident on the diffuser plate; and
    at least an optical film disposed over the diffuser plate, wherein the optical film comprises a prism film.

12. The apparatus of claim 11, wherein a material of the diffuser plate comprises a thermoplastic.

13. The apparatus of claim 12, wherein a material of the diffuser plate comprises a polycarbonate (PC), a polypropylene (PP) or an acrylonitrile butadiene styrene (ABS).

14. The apparatus of claim 11, wherein a material of the diffuser plate comprises a thermosetting plastic.

15. The apparatus of claim 14, wherein a material of the diffuser plate comprises poly-(methyl methacrylate) (PMMA).

16. The apparatus of claim 11, further comprising a lamp box and a light source in the lamp box, wherein the diffuser plate and optical film are also in the lamp box.

* * * * *